(12) United States Patent
Yamamoto et al.

(10) Patent No.: US 6,921,598 B2
(45) Date of Patent: Jul. 26, 2005

(54) POLYMER ELECTROLYTE FUEL CELL AND METHOD OF MANUFACTURING THE SAME

(75) Inventors: Masao Yamamoto, Kishiwada (JP); Junji Niikura, Hirakata (JP); Nobuhiro Hase, Kawanishi (JP); Kazuhito Hatoh, Osaka (JP); Hisaaki Gyoten, Shijonawate (JP); Hideo Ohara, Katano (JP); Teruhisa Kanbara, Toyonaka (JP); Tatsuo Yamazaki, deceased, late of Tokyo (JP); by Masayo Sugou, legal representative, Tokyo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 388 days.

(21) Appl. No.: 10/220,051

(22) PCT Filed: Mar. 6, 2001

(86) PCT No.: PCT/JP01/01746

§ 371 (c)(1),
(2), (4) Date: Aug. 27, 2002

(87) PCT Pub. No.: WO01/67532

PCT Pub. Date: Sep. 13, 2001

(65) Prior Publication Data

US 2004/0197633 A1 Oct. 7, 2004

(30) Foreign Application Priority Data

| Mar. 7, 2000 | (JP) | 2000-061476 |
| Mar. 31, 2000 | (JP) | 2000-097303 |
| Jul. 3, 2000 | (JP) | 2000-201163 |
| Aug. 24, 2000 | (JP) | 2000-253716 |

(51) Int. Cl.[7] ......... H01M 2/14; H01M 8/10; H01M 2/00; B28B 5/00

(52) U.S. Cl. ............ 429/34; 429/30; 429/26; 429/38; 264/241; 427/115

(58) Field of Search ............... 429/34, 30, 26, 429/38; 264/241; 427/115

(56) References Cited

U.S. PATENT DOCUMENTS 5,922,485 A * 7/1999 Enami ............... 429/26

FOREIGN PATENT DOCUMENTS

| JP | 58-38977 | 9/1956 |
| JP | 58-166658 | 10/1983 |

(Continued)

Primary Examiner—Patrick Joseph Ryan
Assistant Examiner—Angela J. Martin
(74) Attorney, Agent, or Firm—McDermott Will & Emery LLP

(57) ABSTRACT

The present invention relates to a polymer electrolyte fuel cell comprising: an electrolyte membrane-electrode assembly including an anode, a cathode and a polymer electrolyte membrane interposed therebetween; an anode-side conductive separator plate having a gas flow channel for supplying a fuel gas to the anode; and a cathode-side conductive separator plate having a gas flow channel for supplying an oxidant gas to the cathode.

A conductive separator plate made of carbon has poor wettability with water. This has posed the disadvantage that variations in performance are induced by nonuniform gas distribution among cells due to the accumulation of product water or humidifying water in the gas flow channel on the surface of the separator plate.

The present invention employs a conductive separator plate comprising a conductive carbon having a hydrophilic functional group, at least in a portion of the gas flow channels, thereby preventing water from accumulating in the gas flow channels.

16 Claims, 9 Drawing Sheets

FOREIGN PATENT DOCUMENTS

| | | |
|---|---|---|
| JP | 59-182871 | 12/1984 |
| JP | 61-145475 | 9/1986 |
| JP | 61-256568 | 11/1986 |
| JP | 4-337250 | 11/1992 |
| JP | 5-74469 | 3/1993 |
| JP | 6-231793 | 8/1994 |
| JP | 7-220734 | 8/1995 |
| JP | 7-235324 | 9/1995 |
| JP | 8-96820 | 4/1996 |
| JP | 9-50817 | 2/1997 |
| JP | 11-16591 | 1/1999 |
| WO | WO 94/05049 * 3/1994 ............ H01M/2/14 |

* cited by examiner

POLYMER ELECTROLYTE FUEL CELL AND METHOD OF MANUFACTURING THE SAME

TECHNICAL FIELD

The present invention relates to fuel cells employing polymer electrolyte which are used in portable power sources, electric vehicle power sources, domestic cogeneration systems and the like, particularly to the improvement of the conductive separator plate thereof.

BACKGROUND ART

A fuel cell employing polymer electrolyte generates electric power and heat simultaneously by electrochemically reacting a fuel gas containing hydrogen and an oxidant gas containing oxygen such as air. This fuel cell is basically composed of a polymer electrolyte membrane for selectively transporting hydrogen ions, and a pair of electrodes formed on both sides of the polymer electrolyte membrane, i.e., an anode and a cathode. The electrode usually comprises a catalyst layer which is composed mainly of carbon particles carrying a platinum group metal catalyst and a diffusion layer which has both gas permeability and electronic conductivity and is formed on the outer surface of the catalyst layer.

Gaskets are arranged on the periphery of the electrodes with the polymer electrolyte membrane disposed therebetween so as to prevent a fuel gas and an oxidant gas supplied to the electrodes from leaking out or prevent these two kinds of gases from mixing with each other. The gaskets are combined integrally with the electrodes and polymer electrolyte membrane beforehand. This is called "MEA" (electrolyte membrane-electrode assembly). Disposed outside the MEA are conductive separator plates for mechanically securing the MEA and for connecting adjacent MEAs electrically in series. At a portion thereof to come in contact with the MEA, the separator plates have gas flow channels for supplying reactant gases to the electrode surfaces and for removing a generated gas and excess gas. While the gas flow channels may be provided separately from the separator plates, grooves are usually formed on the surfaces of the separator plates to serve as the gas flow channels.

In order to supply a fuel gas and an oxidant gas to these grooves, it is necessary to use piping jigs which branch respective supply pipes for the fuel gas and oxidant gas according to the number of the separator plates to be used, and which connect the branches directly to the grooves of the separator plates. This jig is called "manifold" and the above-described type of manifold, which directly connects the fuel gas and oxidant gas supply pipes to the grooves of the separator plates, is called "external manifold". There is also another type of manifold, called "internal manifold", which has a more simple structure. In the internal manifold, the separator plates with the gas flow channels formed thereon are provided with through holes which are connected to the inlet and outlet of the gas flow channels such that the fuel gas and oxidant gas are supplied directly from these holes.

Since the fuel cell generates heat during operation, it needs to be cooled with a cooling water or the like to maintain the cell in good temperature conditions. Normally, a cooling section for flowing the cooling water is generally provided for every one to three cells. There are two types of configurations for the cooling section: one in which the cooling section is inserted between the separator plates; and the other in which the cooling section is formed by providing the backsides of the separator plates with cooling water flow channels, and the latter configuration is more often employed. In a general structure of a fuel cell stack, the MEAs, separator plates and cooling sections as described above are alternately stacked to form a stack of 10 to 400 cells, and the resultant cell stack is sandwiched by end plates with a current collector plate and an insulating plate interposed between the cell stack and each end plate, and is clamped with clamping bolts from both sides.

In such a polymer electrolyte fuel cell, the separator plates need to have high conductivity, high gas tightness with respect to the fuel gas, and high corrosion resistance to oxidation/reduction reactions of hydrogen/oxygen, i.e., acid resistance. For such reasons, conventional separator plates have been produced, for example, by forming gas flow channels on the surface of a glassy carbon plate or a resin-impregnated graphite plate by cutting, or by putting an expanded graphite powder together with a binder in a pressing die which has grooves forming the gas flow channels formed therein, followed by press working and the subsequent heat treatment.

As described above, in the case of the method in which the separator plate is produced by cutting a glassy carbon plate, a resin-impregnated graphite plate or the like, the material cost itself for the glassy carbon plate or resin-impregnated graphite plate is high, and moreover, it is difficult to reduce the cost for cutting these materials. In the case of the method involving the press working of expanded graphite, it is difficult to improve the mechanical strength of the material, and particularly, when it is used as the power source for an electric vehicle, crack may occur due to vibration or impact during traveling. Additionally, there is the problem of difficulty in eliminating the gas permeability.

Moreover, such carbon separator plates have poor wettability with product water formed by the electrode reaction in the cell, because graphite used as the conductive agent is inherently hydrophobic. This results in a so-called flooding problem in which the gas flow channels on the surfaces of the separator plates are clogged with product water. When a large number of fuel cells are connected in series, the gas distribution among the stacked cells becomes nonuniform because the surfaces of the separator plates have poor wettability with product water, leading to another problem of variations in performance.

The polymer electrolyte fuel cell is generally used at an operating temperature of 50 to 100° C., preferably 70 to 90° C. for the purpose of reducing the specific resistance of the polymer electrolyte membrane to maintain a high power generation efficiency. The specific resistance of the polymer electrolyte membrane is reduced by humidifying the membrane to saturation so that the membrane functions as a hydrogen ion-conductive electrolyte. Accordingly, in order to maintain the power generation efficiency of the fuel cell, it is necessary to maintain the water content of the membrane in a saturated condition. For this purpose, there has been adopted a method for preventing the dehydration of the membrane, in which method water is supplied to reactant gases and the reactant gases having increased water contents are supplied to the fuel cell to suppress water evaporation from the membrane into the gases.

However, water is produced as a reaction product during the power generation by the fuel cell, and the reaction product water is discharged to the outside of the fuel cell, together with an excess reactant gas. This results in a difference between the amount of water contained in the reactant gas on the upstream side and that on the downstream side of the gas flow within the cell; accordingly, the amount of water contained on the downstream side, i.e., the outlet side, of the reactant gas is greater than that contained on the upstream side, i.e., the inlet side, by the amount equivalent to the reaction product water.

For this reason, when the reactant gases humidified to saturation are supplied to the cell in order to maintain the water content of the membrane in a saturated condition, water vapor becomes supersaturated on the outlet side and thus turns to water droplets to be mixed in the gases. Moreover, the water vapor may accumulate, as water droplets, at the inside of gas distribution grooves which serve as the reactant gases flow channels of the separator plates, and may further blockade the channels to impede the flows of the gases, resulting in supply shortage of the reactant gases, degradation of the cell performance and the like.

In addition, when the gas distribution grooves have a large width, there is the possibility that the MEA may be deformed to dangle in the gas flow channel to blockade the gas distribution grooves thereby impeding the flows of the gases, leading to supply shortage of the reactant gases, degradation of the cell performance and the like.

As the polymer electrolyte membrane, which serves the major function in the polymer electrolyte fuel cell, an ion-exchange membrane is currently employed. The ion-exchange membrane has the property of capturing any metal ions present by replacing them with protons contained in the membrane. The number of protons migrating through the membrane is decreased to increase resistance to ionic conduction when the metal ions are captured, resulting in the performance degradation of the fuel cell itself. For this reason, the fuel cell is designed to have a structure in which no metal ion reach the electrolyte membrane.

In a system employing the fuel cell, a coolant is usually carried from a fuel cell stack to an external heat exchanger via pipes, and it is then introduced to the fuel cell stack again. In general, the heat exchanger is made from a material with high thermal conduction, i.e., a metal material such as copper or aluminum. Such materials are susceptible to corrosion. Therefore, corrosion is likely to occur especially when the coolant is water, and the metal ion concentration in the cooling water is increased to such an extent that it cannot be ignored.

A separator plate comprising a mixture of resin and carbon has extremely fine gaps between carbon particles, and thus is not completely gas tight. For example, the nitrogen permeability coefficient thereof is about $1 \times 10^{-16}$ to $2 \times 10^{-15}$ mol/m·s·Pa.

Accordingly, when the separator plate comprising a mixture of resin and carbon is provided with a coolant flow channel, the coolant and metal ions dissolved therein permeate the wall of the separator plate little by little, although in an extremely small amount. It is particularly noted that the temperature is elevated in the fuel cell during operation. Moreover, a certain degree of pressure is applied to circulate the coolant in the narrow coolant flow channel. Furthermore, in many cases, the pressure applied to the fuel gas and oxidant gas sides is lower than that applied to the coolant, so that a force is exerted to extrude the coolant to the gas flow channel side. Consequently, the amount of the coolant permeating the separator plate is increased.

When the coolant leaches out to the gas flow channel side through the fine gaps or pores present in the molded body of carbon, excessive humidification occurs if the coolant is water, which may in some cases produce water droplets to inhibit the gases from flowing smoothly. If the coolant is oil or the like, it adheres to the electrode surfaces to produce undesirable effect to the fuel cell, such as inhibition of the functions of the electrode.

The fuel cell has a long useful life of about 5 to 10 years when used in cogeneration systems and the like. Therefore, even an extremely small amount of coolant permeation can cause impurities, such as metal ions contained in the coolant, to enter into the gas flow channels through the coolant flow channels over a long period of time and to be eventually taken into the polymer electrolyte membrane, thereby leading to degradation in performance.

Since the coolant is circulated in substantially the entire fuel cell stack, the components in contact with the coolant have a considerable degree of potential with respect to the coolant by the power generation of the fuel cell itself. While such potential varies among the sites of the fuel cell stack, if the coolant is tonically conductive, the potential is sufficient to induce corrosion due to some sort of an electrochemical reaction even in the case of a stack of several tens of cells; accordingly, the possibility is extremely high that the components will leach out and corrode in some way. Such phenomenon cannot be ignored even in the case of a separator plate comprising carbon and resin.

Thus, it is extremely important to control the ionic conductivity of the coolant, and therefore, when water is used as the coolant, an ion-exchange membrane may be installed in the circulating network of the cooling water for the purpose of suppressing an increase in the ionic conductivity, which is inevitably increased during operation of the fuel cell system. However, such method is less than perfect because an elevated temperature of the cooling water provides a stringent condition for the use of the ion-exchange membrane and thus poses the problems relating to performance, durability and the like, as well as the disadvantage such that the ion-exchange membrane has to be replaced periodically.

It is an object of the present invention to improve a conductive separator plate comprising a molded body comprising a conductive carbon at least in a portion of the gas flow channels, thereby preventing nonuniform gas distribution among the cells due to the accumulation of product water or humidifying water in the gas flow channels of the separator plates and the resulting variations in performance.

It is another object of the present invention to provide means for effectively discharge water droplets generated on the downstream side of the grooves forming the gas flow channels to the outside of a fuel cell, thereby realizing a polymer electrolyte fuel cell which permits a stable and uniform distribution of the reactant gases.

It is still another object of the present invention to prevent the coolant from permeating through the separator plate from the coolant flow channel side to leach out to the gas flow channel side, thereby inhibiting metal ions and the like contained in the coolant from reaching the electrolyte membrane to degrade the cell performance.

DISCLOSURE OF INVENTION

The present invention relates to a polymer electrolyte fuel cell comprising:

an electrolyte membrane-electrode assembly including an anode, a cathode and a polymer electrolyte membrane interposed therebetween;

an anode-side conductive separator plate having a gas flow channel for supplying a fuel gas to the anode;

a cathode-side conductive separator plate having a gas flow channel for supplying an oxidant gas to the cathode;

a coolant flow channel formed between specific anode-side conductive separator plate and cathode-side conductive separator plate; and means for supplying a fuel gas, an oxidant gas and a coolant to each of the gas flow channels and coolant flow channel, respectively wherein the conductive separator plates comprise a conductive carbon having a hydrophilic functional group, at least in a portion of the gas flow channels.

It is effective that the number of the grooves forming the gas flow channels of the conductive separator plate is larger on the downstream side than on the upstream side of the gas flow.

It is preferable that the separator plates having the coolant flow channel have a coolant-impermeable film on the inner surface of the coolant flow channel.

In a preferred mode of the present invention, the conductive separator plates comprise a molded body of a mixture comprising a conductive carbon having a hydrophilic functional group at least in a portion of the surface thereof and a binder.

In another preferred mode of the present invention, the conductive separator plates comprise a molded body comprising a mixture of a conductive carbon and a binder, and are provided with a hydrophilic group at least in a portion of the gas flow channels.

BEST MODE FOR CARRYING OUT THE INVENTION

Figure 1:
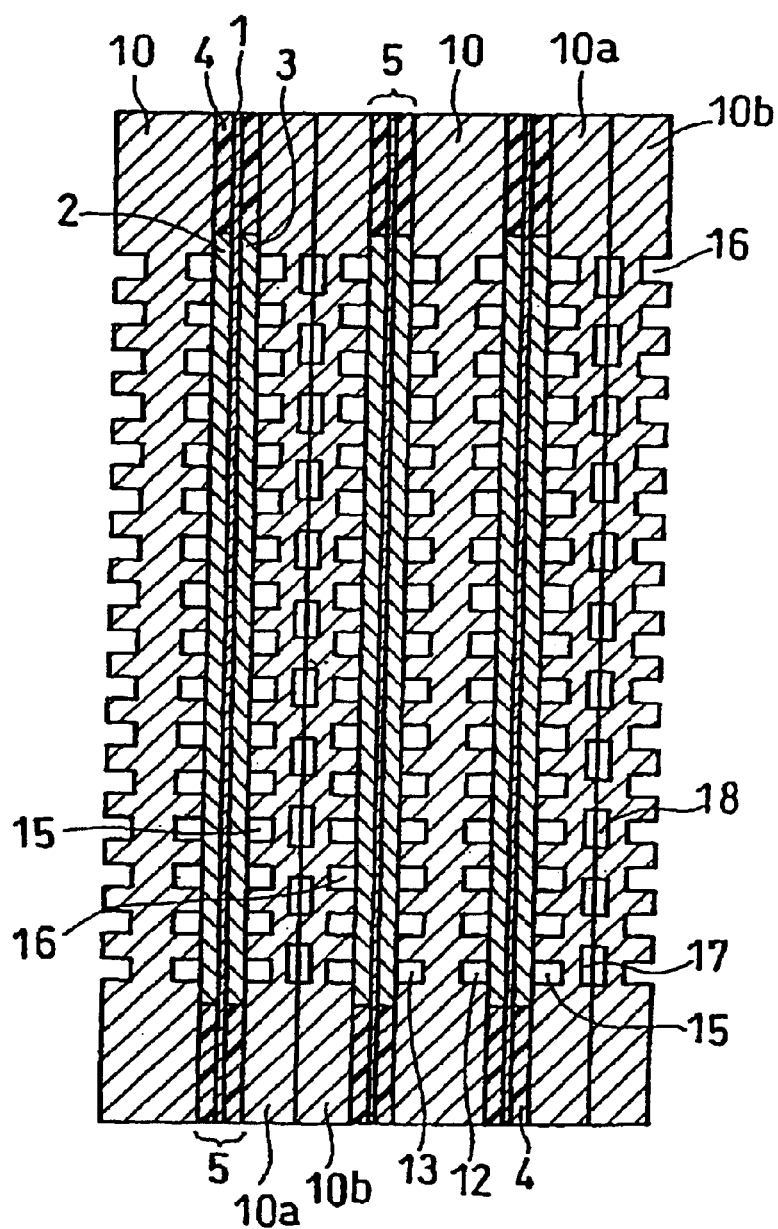
FIG. 1 is a vertical sectional view showing a typical structure of a polymer electrolyte fuel cell to which the present invention is applied.

The polymer electrolyte fuel cell in accordance with the present invention comprises conductive separator plates comprising a conductive carbon having a hydrophilic functional group, at least in a portion of the gas flow channels thereof.

The conductive separator plates may be produced by molding a mixture comprising a conductive carbon having a hydrophilic functional group at least in a portion of the surface thereof and a binder. Another method of producing the conductive separator plates is a method in which a molded body of a mixture comprising a conductive carbon and a binder is processed to form gas flow channels and at least a portion of the gas flow channels is provided with a hydrophilic group.

In the former method, a carbon particle and/or carbon fiber which has been previously provided with a hydrophilic functional group on the surface thereof is mixed with a binder such as a resin or an elastomer. The carbon provided with hydrophilicity has a small contact angle with the resin or elastomer, so that it can be sufficiently mixed to improve the mechanical strength of the resulting molded body. Consequently, die molding can be readily performed even when the mixing amount of the binder is decreased. Further, this increases the filling amount of carbon in the molded body, thereby improving the conductivity of the molded body. Because the closest packing of carbon in the molded body can be achieved for the same reason, it is also possible to decrease the gas permeability.

Separator plates produced by the above-described methods can lower the cost more successfully than conventional ones produced by cutting a glassy carbon plate, a resin-impregnated graphite plate and the like. Additionally, they have vibration resistance as well as impact resistance and are therefore effectively applied to the power sources of automobiles.

Effective methods of providing the surface of carbon particles or carbon fiber with a hydrophilic functional group are those in which carbon particles or carbon fiber is subjected to an oxidation treatment. More specifically, examples of the methods include: a method in which a baking treatment is performed at a temperature of about 400° C. to 600° C. for a short period of time in an oxidizing atmosphere containing oxygen such as air; a method in which carbon particles or carbon fiber is treated in an ozone atmosphere; a method in which a plasma treatment is conducted; a method in which an immersion treatment in an acidic solution such as nitric acid and the subsequent washing with water are performed; and a method in which a treatment with a hydrogen peroxide solution and the subsequent washing with water are performed. The same methods as described above can also be employed for providing the surface of a molded carbon material with a hydrophilic group.

As described above, the conductive separator plate in accordance with the present invention has a hydrophilic functional group at least in a portion of the gas flow channels, and thus has a decreased contact angle with water. This improves the wettability with water of the gas flow channel surfaces of the separator plates, so that it is possible to reduce variations in performance among the stacked cells even when the gas distribution becomes nonuniform among the stacked cells. The cell performance is particularly improved during the power generation at a high current density, because it is possible to remove product water smoothly.

The gas flow channels of the conductive separator plate in accordance with the present invention can be further improved in hydrophilicity by providing concaves or convexes having a mean diameter or width of 50 μm to 1 mm on the inner surfaces of the gas flow channels. This improves the wettability with product water of the surface of the separator plate even further, thereby rendering the gas distribution among the cells more uniform as well as reducing variations in performance among the cells.

Furthermore, an improved wettability with product water of the separator plate surface enables a smooth removal of product water accumulated inside the separator plate, and thus suppresses the degradation of the cell performance especially during the operation at a high current density. Such an effect, however, is only achieved when the contact angle with water of the material forming the separator plate is less than 90°. In other words, when the contact angle with water of the material forming the separator plate is 90° or more and the material forming the separator plate has water repellency, the provision of concaves and convexes on the gas flow channel of the separator plate undesirably increases the water repellency of the separator plate, producing an adverse effect. Therefore, in order to improve the hydrophilicity, it is effective to provide the surface of carbon particles or carbon fiber, which constitute the separator plate, with a hydrophilic functional group to reduce the contact angle with water of the carbon particles or carbon fiber.

The most convenient technique to provide the concaves and convexes on the gas flow channel of the separator plate is providing a concavo-convex section on a die used for molding a mixture of a carbon and a binder. By forming concaves or convexes provided on the molding die in an inverse cone shape, inverse pyramid shape, inverse truncated cone shape or inverse truncated pyramid shape, it is possible to improve the release property of the separator plate from the die after molding. The hydrophilicity of the gas flow channels of the conductive separator plate is effectively improved by forming the concaves or convexes to have a mean diameter or width of 50 µm to 1 mm, preferably 100 µm to 1 mm.

FIG. 1 shows a typical structure of a fuel cell to which the present invention is applied.

MEAs 5 each comprising a polymer electrolyte membrane 1, an anode 2 and a cathode 3 sandwiching the electrolyte membrane 1 therebetween and a gasket 4 disposed on the periphery of the electrolyte membrane, are stacked with a conductive separator plate 10 interposed therebetween. The conductive separator plate 10 has fuel gas and oxidant gas flow channels 12 and 13 respectively on the anode side and cathode side and also serve as an anode-side separator plate and a cathode-side separator plate. In order to cool the fuel cell, a separator plate having a coolant flow channel is also employed. In the example shown in FIG. 1, an anode-side separator plate 10a having a fuel gas flow channel 15 on one side and a coolant flow channel 17 on the other side is bonded to a cathode-side separator plate 10b having an oxidant gas flow channel 16 on one side and a coolant flow channel 18 on the other side in such a manner that the flow channels 17 and 18 face each other.

Figure 2:
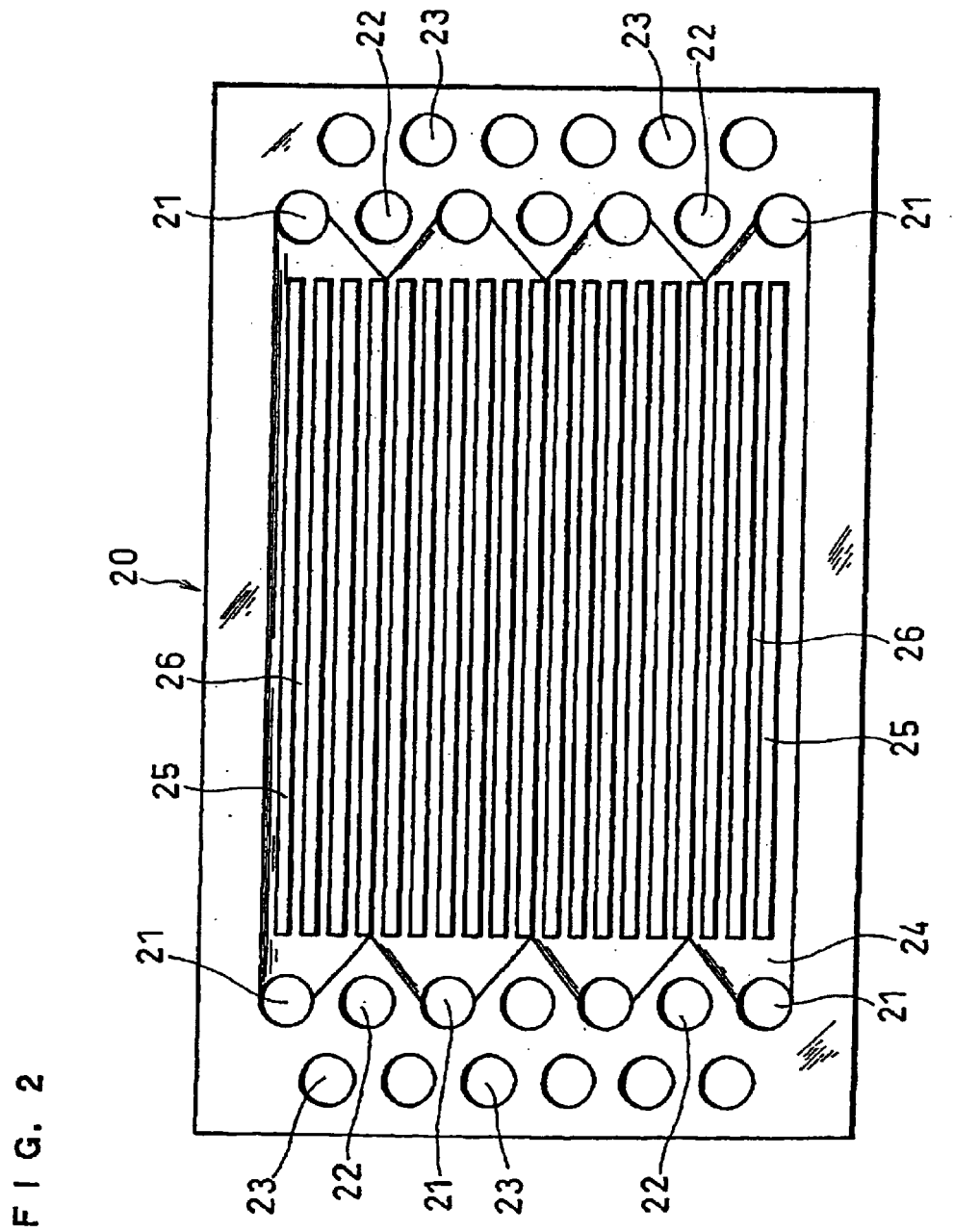
FIG. 2 is a front view of the cathode side of a separator plate used in an example of the present invention.

FIG. 2 shows a typical example of a conductive separator plate in accordance with the present invention.

A separator plate 20 shown herein is produced by molding a mixture of carbon and a binder, and has four manifold apertures 21 respectively on the inlet and outlet sides of the oxidant gas, three manifold apertures 22 respectively on the inlet and outlet sides of the fuel gas and six manifold apertures 23 respectively on the inlet and outlet sides of the cooling water. Disposed on the side of this separator plate facing the cathode is a recess 24 for connecting the manifold apertures 21 on the inlet and outlet sides, and a plurality of parallel ribs 25 are provided inside this recess, with a gas flow channel 26 formed between the ribs. On the backside of this separator plate, a plurality of gas flow channels for connecting the manifold apertures 22 on the inlet and outlet sides of the fuel gas are formed in the same manner as described above. Similarly, a cooling section is formed by combining a separator plate having an oxidant gas flow channel formed on one side and a cooling water flow channel on the other side and a separator plate having a fuel gas flow channel on one side and a cooling water flow channel on the other side in such a manner that the cooling water flow channels face each other.

Figure 3:
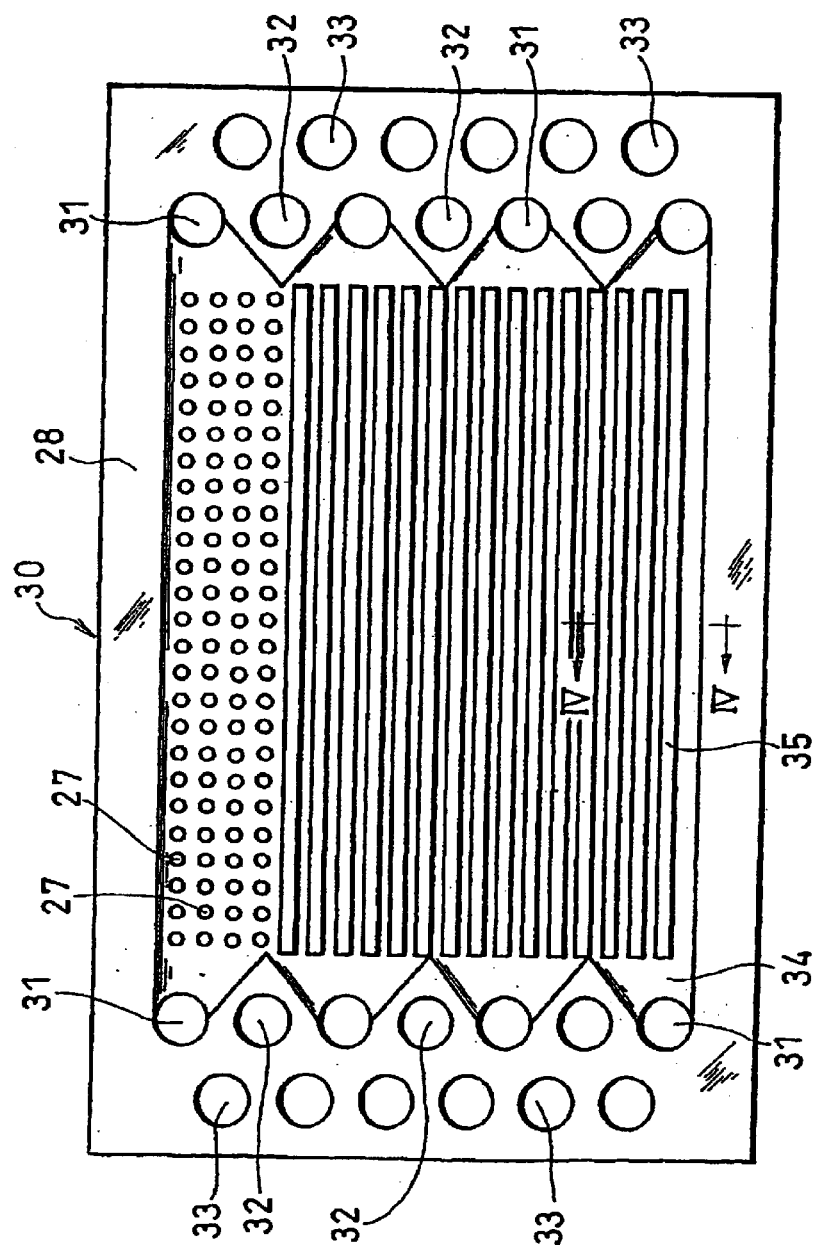
FIG. 3 is a front view of a separator plate with a portion thereof cut out, which is used in another example.
Figure 4:
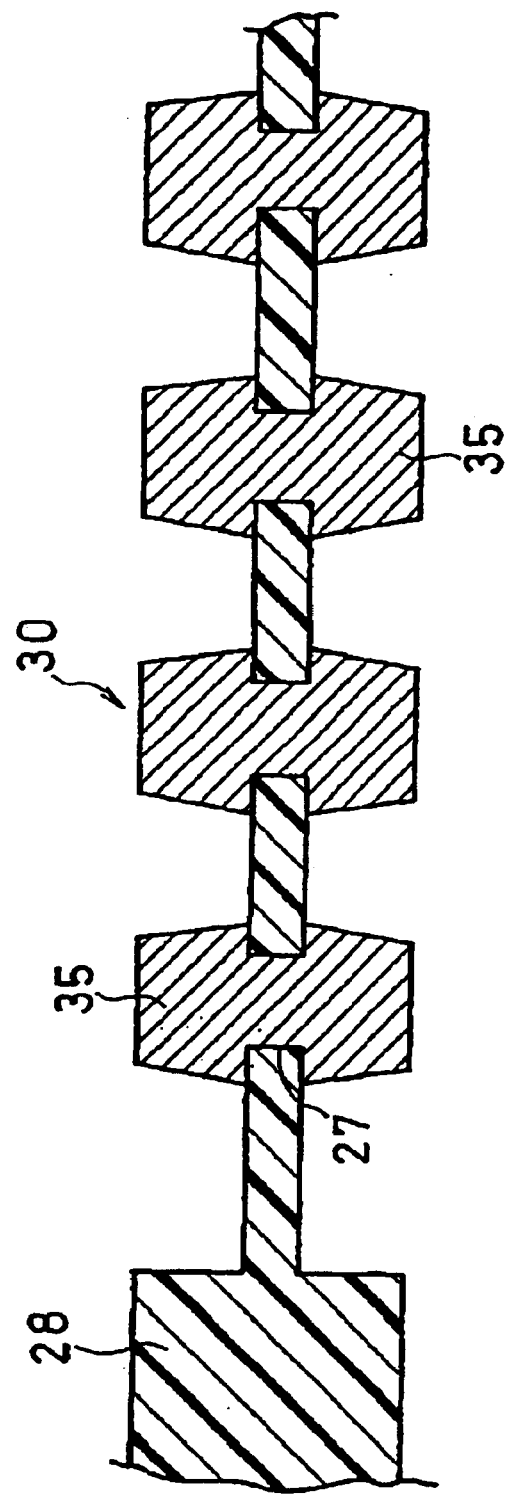
FIG. 4 is a sectional view taken on line IV–IV in FIG. 3.

FIG. 3 shows another type of a conductive separator plate produced by combining an insulating plate and rib members comprising a conductive carbon.

A separator plate 30 shown herein is produced by integrally molding rib members 35 comprising a conductive carbon to an insulating plate 28 provided with oxidant gas manifold apertures 31, fuel gas manifold apertures 32, cooling water manifold apertures 33, a recess 34 for connecting the oxidant gas manifold apertures 31 and rows of apertures 27 penetrating through the front and backsides of the recess 34. The rib members 35 form an oxidant gas flow channel on one side and a fuel gas or cooling water flow channel on the other side. The rib members 35 are integrally connected by molding a mixture of a conductive carbon and a binder to the insulating plate.

With this structure, the thickness of the separator plate can be reduced by employing a high strength material, for example, an engineering plastic such as polyimide, for the insulating plate.

As the engineering plastic, polypropylene, styrene resin, modified polyphenylene ether, polycarbonate, polyacetal, polyamide, polyphenylene sulfide, polyester and the like may be employed, apart from a liquid crystal polymer used in an example described below.

Next, descriptions are made on the structure of grooves forming the gas flow channels of the conductive separator plate.

In a preferred mode of the present invention, the number of the grooves forming the gas flow channels is larger on the downstream side than on the upstream side of the gas flow.

As a means for increasing the number of the grooves forming the gas flow channels on the downstream side, a protrusion is provided at least in a portion of the grooves forming the gas flow channels, and this protrusion serves to branch the grooves forming the gas flow channels into plural parts.

It is effective that the cross-sectional area, perpendicular to the gas flow, of the protrusion increases in the downstream direction.

It is effective that the protrusion is electrically conductive.

In another mode, it is effective that the protrusion comprises silicone rubber.

It is effective that the protrusion has a height lower than the depth of the grooves forming the gas flow channels so as to allow passage of the gases on the upper surface of the protrusion.

In still another mode, it is effective that the grooves forming the gas flow channels of the conductive separator plate have water repellency, and that the water repellency is higher on the downstream side than on the upstream side of the gas flow.

Herein, the protrusion may be composed of the same material as that of the separator plate. In this case, a separator plate having the protrusion can be produced by integral molding.

The protrusion may be provided after a separator plate having a conventional configuration has been produced. In this case, there is no specific limitation on the material forming the protrusion, insofar as it is one that does not degrade by the gases supplied; for example, an acrylic resin or silicone rubber may be employed. In order to prevent an increase in the contact resistance between unit cells, the protrusion is preferably provided with conductivity. The conductivity can be provided by mixing the material forming the protrusion with, for example, a conductive filler.

The above-described structure of the grooves forming the gas flow channels of the separator plate improves product water-removal efficiency on the downstream side where water droplets are particularly easy to accumulate; accordingly, the reactant gases are stably distributed, making it possible to suppress the performance degradation of the fuel cell.

Such an effect is achieved by the following function. Specifically, since the number of the grooves forming the gas flow channels is larger on the downstream side than on the upstream side of the gas flow, as described above, the cross-sectional area of the grooves forming the gas flow channels is decreased on the downstream side; therefore, the gas flow rate per unit area is increased on the downstream side where water droplets are accumulated. As a result, an increased gas flow rate improves water droplet-removal efficiency, so that water droplets do not accumulate in the grooves forming the gas flow channels, but instead are led to a predetermined outlet. In view of the fact that water droplets are more likely to accumulate on the downstream side, the removal efficiency can be further improved by employing the structure in which the cross-sectional area occupied by the protrusion increases in the downstream direction.

When the protrusion is provided with conductivity, the conductivity of the separator plate itself is not reduced, and the cell performance will not therefore be affected. Even when the protrusion is not provided with conductivity, the non-conductivity of the protrusion itself does not directly influence the conductivity of the separator plate itself insofar as the height of the protrusion is reduced, so that the cell performance will not be affected.

The removal efficiency is further improved by performing a water-repellent treatment on the inner surfaces of the grooves forming the gas flow channels on the downstream side of the separator plate. The reason is that the contact angles of water droplets with the inner surfaces of the grooves forming the gas flow channels are increased to reduce the adhesion of water droplets to the grooves forming the gas flow channels, leading to a reduction in the constraining force which keeps water droplets on the inner surfaces of the grooves forming the gas flow channels.

Next, in a preferred mode of the present invention, a conductive separator plate having a flow channel for a coolant, typically water, has a coolant-impermeable film on the inner surface of the coolant flow channel. The coolant-impermeable film may be formed in the following manner.

Firstly, a coating is injected into the coolant flow channel of the separator plate to apply the coating on the inner wall of the flow channel, and the coating is then dried and hardened to form a coating film through which the coolant is difficult to permeate. This coating film prevents the coolant and metal ions contained therein from leaching out to the gas flow channel side.

One preferred method of forming such a coating film on the inner surface of the coolant flow channel comprises the steps of: assembling a fuel cell stack; injecting a pre-polymer of a non-conductive polymer into the coolant flow channel to apply the pre-polymer on the inner surface of the flow channel, while applying a clamping pressure to the stack; and solidifying the applied pre-polymer after discharging the pre-polymer.

Hereinafter, examples of the present invention are described with reference to drawings. It should be noted that the structural drawings used herein are intended to facilitate the understanding and the relative sizes and positional relations of various elements are not necessarily accurate.

EXAMPLE 1

Firstly, an acetylene black powder was allowed to carry platinum particles having a mean particle size of about 30 Å at a weight ratio of 75:25 to prepare an electrode catalyst powder. A dispersion of this catalyst powder in isopropanol was mixed with a dispersion of perfluorocarbon sulfonic acid powder in ethyl alcohol to prepare a catalyst paste.

Meanwhile, a water-repellent treatment was performed on carbon paper, which later served as an electrode substrate. Carbon nonwoven fabric (TGP-H-120 manufactured by Toray Industries, Inc.) having dimensions of 16 cm×20 cm and a thickness of 360 $\mu$m was impregnated with an aqueous dispersion of a fluorocarbon resin (Neoflon ND 1 manufactured by DAIKIN INDUSTRIES, Ltd.), and thereafter, it was dried and heated at 400° C. for 30 minutes to be provided with water repellency. The catalyst paste was applied on one side of this carbon nonwoven fabric by screen-printing to form a catalyst layer. The catalyst layer was partly embedded in the carbon nonwoven fabric. This gave an electrode containing 0.5 mg/cm$^2$ platinum and 1.2 mg/cm$^2$ perfluorocarbon sulfonic acid.

Next, a pair of electrodes were joined by hot-pressing to the front and backsides of a hydrogen ion-conductive polymer electrolyte membrane with dimensions of 20 cm×32 cm in such a manner that the catalyst layers were brought into contact with the electrolyte membrane. This yielded an electrolyte membrane-electrode assembly (MEA). The hydrogen ion-conductive polymer electrolyte used herein was a thin film of perfluorocarbon sulfonic acid with a thickness of 50 $\mu$m.

Next, descriptions are made on the conductive separator plate.

Firstly, an artificial graphite powder with a mean particle size of about 10 $\mu$m and fibrous graphite (mean diameter of 50 $\mu$m, mean length of 0.5 mm) were placed in an ozone generator, in which they were irradiated with ultraviolet rays for 30 minutes in an ozone atmosphere while being stirred. Surface analysis of the artificial graphite powder and fibrous graphite subjected to the above-described treatment confirmed the presence of a carbonyl group and a hydroxy group, which were hydrophilic functional groups, on the surface of carbon.

Next, 50 parts by weight of an artificial graphite powder and 38 parts by weight of an fibrous graphite, both subjected to the ozone treatment, were kneaded with 12 parts by weight of a thermosetting phenolic resin by a kneader extruder. The kneaded powder was charged into a die processed for molding grooves forming gas flow channels, grooves forming cooling water flow channels as well as manifold apertures, and the whole was hot-pressed to form a separator plate as shown in FIG. 2. The hot-pressing was performed for 10 minutes under the conditions of a die temperature of 150° C. and a pressure of 100 kg/cm$^2$. The separator plate thus obtained had dimensions of 20 cm×32 cm and a thickness of 1.3 mm, and the gas flow channels and cooling water flow channels thereof had a depth of 0.5 mm. Accordingly, the thinnest part of the separator plate had a thickness of 0.3 mm. The carbon powder and graphite fiber, whose surfaces were provided with a hydrophilic functional group by the ozone treatment, mixed well with the phenolic resin binder, so that hot-pressing the kneaded mixture of the three materials yielded a dense and high-strength separator plate.

The obtained separator plate had a conductivity in the thickness direction of $5\times10^{-3}$ Ωcm, density of 1.98 g/ml, He gas permeability of $2.1\times10^{-17}$ mol·m/(m²·s·Pa) and bending strength of 70 Mpa.

When the same die was used to mix untreated carbon powder and graphite fiber with a phenolic resin, they did not mix well and it was therefore impossible to reduce the thickness of the thinnest part of the separator plate to 0.3 mm, unless the mixing ratio of the phenolic resin was increased to 30% by weight or more. Accordingly, the use of the untreated carbon powder and graphite fiber resulted in poor conductivity because of the increased adding amount of the phenolic resin, and the conductivity in the thickness direction was $15\times10^{-3}$ Ωcm.

When 50 parts by weight of an artificial graphite powder and 38 parts by weight of fibrous graphite, both untreated, were mixed with 12 parts by weight of a phenolic resin in order to form a separator plate, excessive reduction in the thickness caused a fracture or the like, making it impossible to form a separator plate. Consequently, the obtained separator plate had dimensions of 20 cm×32 cm and a thickness of 2.2 mm, and the gas flow channels and cooling water flow channels thereof had a thickness of 0.5 mm. Accordingly, the thinnest part of the separator plate had a thickness of 1.2 mm. This separator plate had a conductivity in the thickness direction of $10\times10^{-3}$ Ωcm, density of 1.75 g/ml, He gas permeability of $3.8\times10^{-12}$ mol·m/(m²·s·Pa) and bending strength of 30 MPa.

Manifold apertures for distributing a cooling water, fuel gas and oxidant gas were formed on the hydrogen-ion conductive polymer electrolyte membrane of the above-described MEA. These apertures were formed at the same position in the same size as the separator plate shown in FIG. 2. While no gasket was used in this example, a gasket may be arranged so as to contact the electrolyte membrane at the periphery of the electrode.

The MEA sheet was inserted between two sheets of the separator plates, each formed with oxidant gas flow channels on one side and fuel gas flow channels on the other side in the above-described manner, thereby producing a unit cell. Then, an anode-side separator plate and an cathode-side separator plate, each having cooling water flow channels formed on the backside thereof, were inserted between every two cells to give a cell stack of 100 cells. At each end of the cell stack, a current collector plate made of stainless steel, an electrically insulating plate and an end plate were stacked, and the two sheets of end plates were fixed with clamping rods. The clamping pressure applied was 15 kgf/cm² per unit area of the separator plate.

The polymer electrolyte fuel cell thus produced by employing the separator plates "a" of this example was maintained at 80° C., and hydrogen gas humidified and heated to have a dew point of 75° C. was supplied to the anode, and air humidified and heated to have a dew point of 65° C. was supplied to the cathode. This resulted in a cell open circuit voltage of 96 V at the time of no load when no current was output to outside. The internal resistance of the entire cell stack was measured to be about 45 mΩ.

A power generation test was continuously-performed on this cell under the conditions of a fuel utilization rate of 85%, oxygen utilization rate of 50% and current density of 0.7 A/cm² to measure the variation over time of the output characteristics. As a result, the cell of this example was confirmed to maintain a cell output of about 14 kW (62V–224A) for over 8000 hours.

COMPARATIVE EXAMPLE 1

50 parts by weight of an artificial graphite powder and 30 parts by weight of fibrous graphite, both untreated, were mixed with 20 parts by weight of a phenolic resin, and the mixture was molded to form a separator plate "a'" in the same manner as in Example 1. The separator plate thus obtained had dimensions of 20 cm×32 cm and a thickness of 1.8 mm, and the gas flow channels and cooling water flow channels thereof had a depth of 0.5 mm. Accordingly, the thinnest part of the separator plate had a thickness of 0.8 mm.

The same power generation test as in Example 1 was continuously performed on this cell to measure the variation over time of the output characteristics. As a result, the cell of Comparative Example 1 maintained a cell output of about 12.8 kW (57V–224A) for about the initial one to three hours. Thereafter, however, the voltage started to fluctuate especially in the cells in the vicinity of the both ends of the stack, and there was confirmed the flooding phenomenon due to excessive humidification of the cells in the vicinity of the both ends. After the elapse of an additional three to five hours, the generating voltage fluctuated to 0 V or lower in some of the cells, making it impossible to continue the operation.

EXAMPLE 2

Firstly, an amorphous carbon plate with dimensions of 20 cm×32 cm and a thickness of 1.6 mm was prepared. This plate was subjected to cutting to have the same shape as in Example 1, thereby forming a conductive separator plate. Since the gas flow channels and cooling water flow channels had a depth of 0.5 mm, the thinnest part of the separator plate had a thickness of 0.6 mm.

This separator plate was baked at 500° C. for 30 minutes in an air atmosphere to provide the surface of the separator plate with a hydrophilic functional group. Surface analysis of a resultant separator plate "b" confirmed the presence of a carbonyl group and a hydroxy group.

The separator plate provided with oxide functional groups on the surface thereof had the same conductivity in the thickness direction, density, He gas permeability and bending strength as those before the oxidation treatment.

The separator plate thus produced was used to fabricate a cell stack of 100 cells in the same manner as in Example 1. The clamping pressure applied was 10 kgf/cm² per unit area of the separator plate.

When a power generation test was continuously performed on this cell under the same conditions as in Example 1, a cell output of about 14 kW (62V–224A) was maintained for over 8000 hours.

COMPARATIVE EXAMPLE 2

An amorphous carbon plate with dimensions of 20 cm×32 cm and a thickness of 1.6 mm was subjected to cutting to have the same shape as in Example 1. This plate was processed so as to have concaves having a mean surface or undersurface roughness of 6.3 μm or less on the gas flow channels, thereby producing a separator plate "b'". The separator plate thus obtained had a conductivity in the thickness direction of $4\times10^{-3}$ Ωcm, density of 1.5 g/ml, He gas permeability of $1.8\times10^{-18}$ mol·m/(m²·s·Pa) and bending strength of about 100 MPa.

When a power generation test was continuously performed on this cell under the same conditions as in Example 1, a cell output of about 14 kW (62V–224A) was maintained for about the initial one hour. After the elapse of one to two hours, however, the voltage started to fluctuate especially in the cells in the vicinity of the both ends of the stack, and there was confirmed the flooding phenomenon due to excessive humidification of the cells in the vicinity of the both ends. After the elapse of an additional two to three hours, the power generating voltage fluctuated to 0 V or lower in some of the cells, making it impossible to continue the operation.

EXAMPLE 3

Firstly, an artificial graphite powder (mean particle size of about 10 µm) and fibrous graphite (mean diameter of 50 µm, mean length of 0.5 mm) were introduced in a 2N nitric acid aqueous solution, stirred for 30 minutes and then washed well with distilled water. Surface analysis of the artificial graphite powder and fibrous graphite subjected to the oxidation treatment confirmed the presence of a carbonyl group and a hydroxy group.

Next, 50 parts by weight of an artificial graphite powder and 38 parts by weight of fibrous graphite, both subjected to the oxidation treatment, was mixed with 12 parts by weight of a thermosetting phenolic resin, and the mixture was kneaded by a kneader extruder. The kneaded mixture was charged into a die and hot-pressed. The hot-pressing was performed for 10 minutes under the conditions of a die temperature of 150° C. and a pressure of 100 kg/cm$^2$.

In the case of the die used herein, convexes with a mean diameter of 100 µm or more were provided on the top faces of projections for forming the gas flow channels of the separator plate, thereby forming a concavo-convex section. The concaves of this concavo-convex section were formed in an inverse truncated cone shape and the convexes thereof in a cone shape. A resultant separator plate "c" had dimensions of 20 cm×32 cm and a thickness of 1.3 mm, and the gas flow channels and cooling water flow channels thereof had a depth of 0.5 mm. On the bottom faces of grooves for forming the gas flow channels of the separator plate, the shape of the die was printed to form concaves and convexes having concaves with a mean diameter of 100 µm or more.

The separator plate thus produced was used to produce a cell stack of 100 cells in the same manner as in Example 1. The clamping pressure applied was 15 kgf/cm$^2$ per unit area of the separator plate.

When a power generation test was continuously performed on this cell under the same conditions as in Example 1, a cell output of about 14.3 kW (64V–224A) was maintained for over 8000 hours.

COMPARATIVE EXAMPLE 3

An amorphous carbon plate with dimensions of 20 cm×32 cm and a thickness of 1.6 mm was subjected to cutting to have the same shape as in Example 1. Further, concaves and convexes with a mean diameter of 50 µm or more were formed by a machining processing on the bottom faces of the gas flow channels to give a separator plate "c'".

When a power generation test was continuously performed on this cell under the same conditions as in Example 1, a cell output of about 14 kW (62V–224A) was generated for about the initial 10 minutes. After the elapse of about 10 minutes, however, the voltage started to fluctuate especially in the cells in the vicinity of the both ends of the stack, and there was confirmed the flooding phenomenon due to excessive humidification of the cells in the vicinity of the both ends. Additionally, the generating voltage fluctuated to 0 V or lower in some of the cells, making it impossible to continue the operation. Therefore, the wettability with water of the separator plate used was examined; consequently, it was confirmed that the water repellency was more increased than that of the original flat amorphous carbon plate because of the formation of the concaves and convexes having a mean diameter of 50 µm or more by machining. The reason that the formation of the concaves and convexes on the surface of the separator plate had resulted in an increased water repellency was that the contact angle with water of the amorphous carbon plate was inherently larger than 90°.

EXAMPLE 4

Firstly, a liquid crystal polymer plate with dimensions of 20 cm×32 cm and a thickness of 0.1 mm, reinforced with glass fiber mixed therein, was prepared. In this plate, manifold apertures for an oxidant gas, fuel gas and cooling water, a recess slot for forming the gas flow channels and a large number of through holes were formed, as shown in FIG. 3.

Next, an artificial graphite powder (mean particle size of about 10 µm) and fibrous graphite (mean diameter of 50 µm, mean length of 0.5 mm) were charged into a 10% hydrogen peroxide aqueous solution, stirred for 10 minutes and then washed well with distilled water. Surface analysis of the thus treated artificial graphite powder and fibrous graphite confirmed the presence of a carbonyl group and a hydroxy group.

50 parts by weight of an artificial graphite powder and 38 parts by weight of fibrous graphite, both subjected to the oxidation treatment, was kneaded with 12 parts by weight of a thermosetting phenolic resin by a kneader extruder. This mixture was charged into a die processed to mold grooves forming the gas flow channels and grooves forming the cooling water flow channels. Herein, the liquid crystal polymer plate, previously subjected to the hole making process, was inserted in the die, and the above kneaded mixture was hot-pressed. The hot-pressing was performed for 5 minutes under the conditions of a die temperature of 150° C. and a pressure of 80 kg/cm$^2$. This gave a separator plate having substantially the same structure as that shown in FIG. 2. At the periphery of the separator plate and the area surrounding the manifold apertures, a projection for gas sealing with the same thickness as that of the rib for forming the gas flow channel, i.e., 0.5 mm, was formed from butyl rubber.

A resultant separator plate "d" had dimensions of 20 cm×32 cm and a thickness of 1.1 mm, and the gas flow channels and cooling water flow channels thereof had a depth of 0.5 mm.

The separator plate thus produced was used to produce a cell stack of 100 cells in the same manner as in Example 1. The clamping pressure applied was 15 kgf/cm$^2$ per unit area of the separator plate.

When a power generation test was continuously performed on this cell, a cell output of about 14.3 kW (64 V–224 A) was maintained for over 8000 hours.

Because the cell of this example employed the conductive separator plate mainly composed of high-strength liquid crystal polymer, it had particularly strong resistance to vibration and impact. When a cell comprising a conventional carbon separator plate was dropped from the height of 2 m, cracking occurred in the separator plate after about 10 times of dropping on average, whereas no unrepairable damage occurred in the cell of this example even after the drop test was repeated about 100 times, except for the loosening of the rods at the clamped portions.

Table 1 shows the physical properties of the separator plates of Examples and Comparative Examples and the comparison among the fuel cells employing the above-mentioned separator plates in terms of the open circuit voltage and internal resistance at the time of no load under the same conditions as in Example 1.

TABLE 1

| Separator plate | Conductivity in thickness direction ($\Omega$cm) | Density (g/ml) | Gas permeability (mol · m/ m² · s · Pa) | Bending strength (MPa) | Cell characteristics | |
|---|---|---|---|---|---|---|
| | | | | | Open circuit voltage at no load (V) | Internal resistance (m$\Omega$) |
| a | $5 \times 10^{-3}$ | 1.98 | $2.1 \times 10^{-17}$ | 70 | 96 | Approx. 45 |
| a' | $18 \times 10^{-3}$ | 1.85 | $1.8 \times 10^{-13}$ | 35 | 95 | Approx. 90 |
| b | $4 \times 10^{-3}$ | 1.5 | $1.8 \times 10^{-18}$ | 100 | 96 | Approx. 50 |
| b' | $4 \times 10^{-3}$ | 1.5 | $1.8 \times 10^{-18}$ | 100 | 96 | Approx. 50 |
| c | $5 \times 10^{-3}$ | 1.98 | $2.1 \times 10^{-17}$ | 70 | 96 | Approx. 40 |
| c' | $4 \times 10^{-3}$ | 1.5 | $1.8 \times 10^{-18}$ | 100 | 96 | Approx. 50 |
| d | $10 \times 10^{-3}$ | | $2.5 \times 10^{-18}$ | | 96 | Approx. 55 |

EXAMPLE 5

In this example, a unit cell having the structure shown in FIG. 1 was used to produce a fuel cell. As the polymer electrolyte membrane, a Nafion film (manufactured by E.I. Du Pont de Nemours & Co. Inc.) was employed. The separator plate used herein was one obtained by placing a mixture of a carbon powder and a phenolic resin into a die, followed by compression molding while heating.

Figure 5:
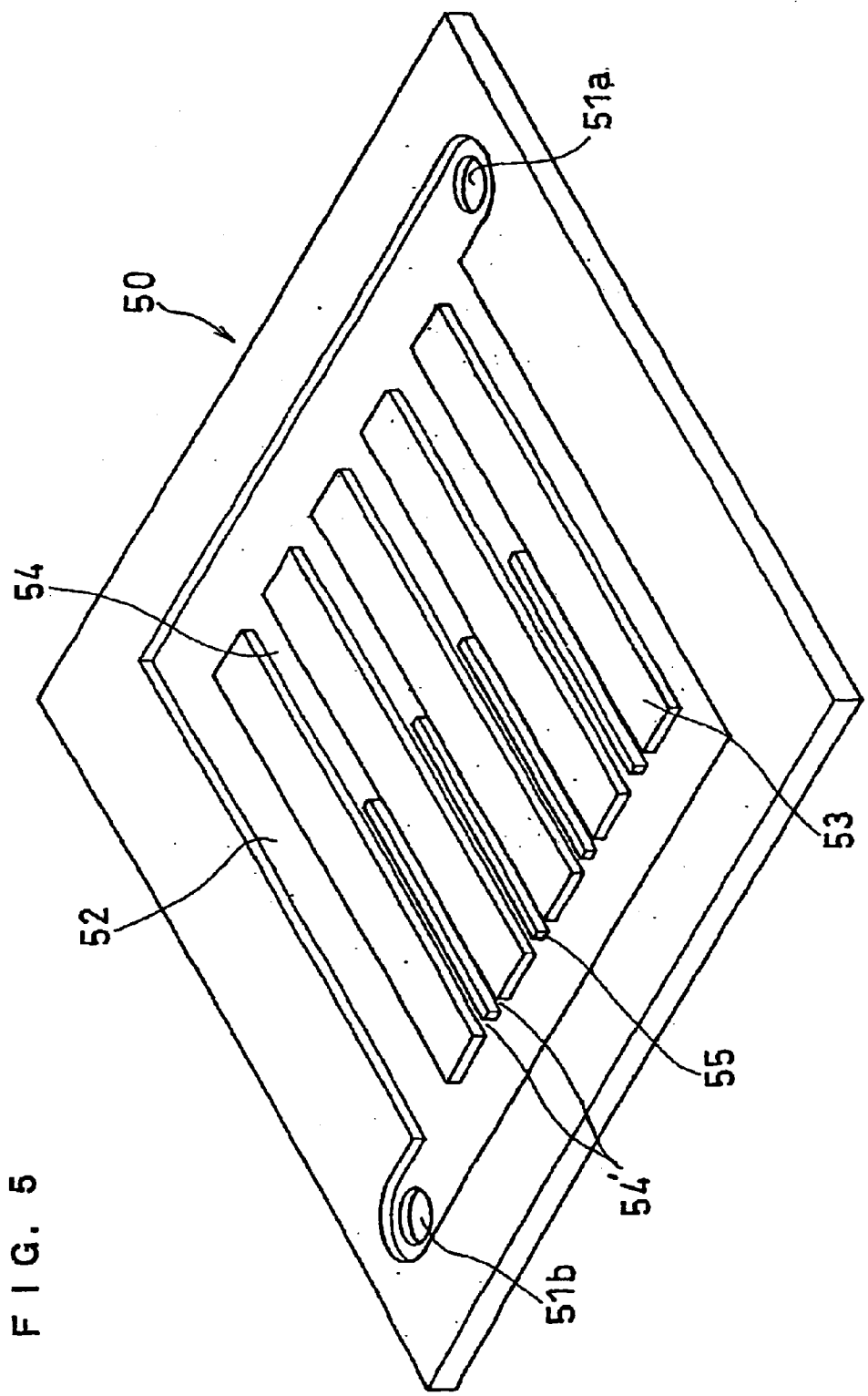
FIG. 5 is a perspective view of a separator plate in another example.

Herein, FIG. 5 shows a schematic structure of the separator plate. A separator plate 50 has, on the cathode side, an inlet-side manifold aperture 51a and an outlet-side manifold aperture 51b for an oxidant gas, and on a recess 52 connecting the two manifold apertures, a plurality of parallel ribs 53 are provided, which form a plurality of grooves forming a gas flow channel 54. In the example, a protrusion 55 is provided in the gas flow channels on the downstream side, except in the gas flow channels at the periphery. The protrusion 55 serves to branch each of the flow channels 54 into two flow channels 54' whose widths are narrower on the downstream side than on the upstream side. In this manner, the number of the grooves forming the gas flow channels was rendered larger on the downstream side than on the upstream side.

With this structure, even when moisture in the reactant gases humidified to saturation and product water formed during the power generation of the fuel cell adhere, as water droplets, to the grooves forming the gas flow channels on the downstream side of the separator plate 50, the water droplets did not accumulate in the grooves forming the gas flow channels because of the decreased cross-sectional area and increased gas flow rate on the downstream side of the grooves forming the gas flow channels.

Although FIG. 5 shows only oxidant gas manifold apertures, it is needles to say that fuel gas manifold apertures and cooling water manifold apertures were formed, and fuel gas flow channels or cooling water flow channels were formed accordingly. The same applies to Examples 6 and 7.

EXAMPLE 6

In this example, a mixture of a carbon powder and a phenolic resin was placed in a die firstly and compression molded while being heated, thereby producing a separator plate having the same structure as shown in FIG. 5 except that no protrusion was provided. Subsequently, a mixture of an acrylic resin and a conductive filler was molded so as to be integrally formed to the inside of the gas flow channel, thereby forming a protrusion 56.

Since the water content of the polymer electrolyte membrane was maintained in a saturated condition during the operation of the cell, there was the possibility that the moisture in the reactant gases supplied in a saturated state and product water reached a supersaturated condition to be liquefied and adhered, as water droplets, in the grooves forming the gas flow channels on the downstream side of the separator plate. In the fuel cell of this example, however, the protrusions served to decrease the cross-sectional area of the grooves forming the gas flow channels on the downstream side to increase the gas flow rate, so that the water droplets did not accumulate in the grooves forming the gas flow channels, but instead were led to a predetermined flow channel. Accordingly, the risk of supply shortage of the reactant gases was obviated and it was thus possible to stably and uniformly distribute the reactant gases.

EXAMPLE 7

Figure 6:
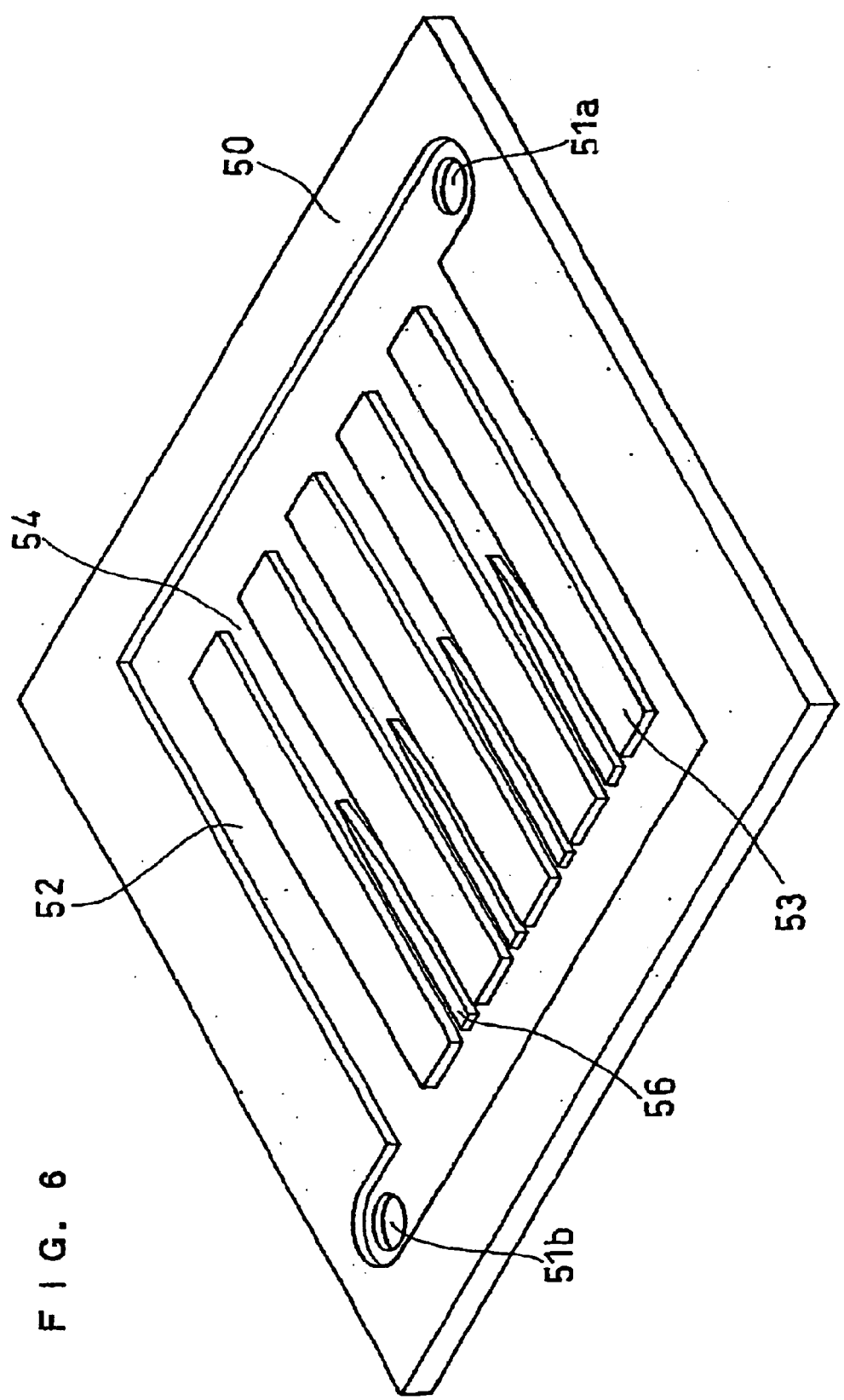
FIG. 6 is a perspective view of a separator plate in still another example.
Figure 7:
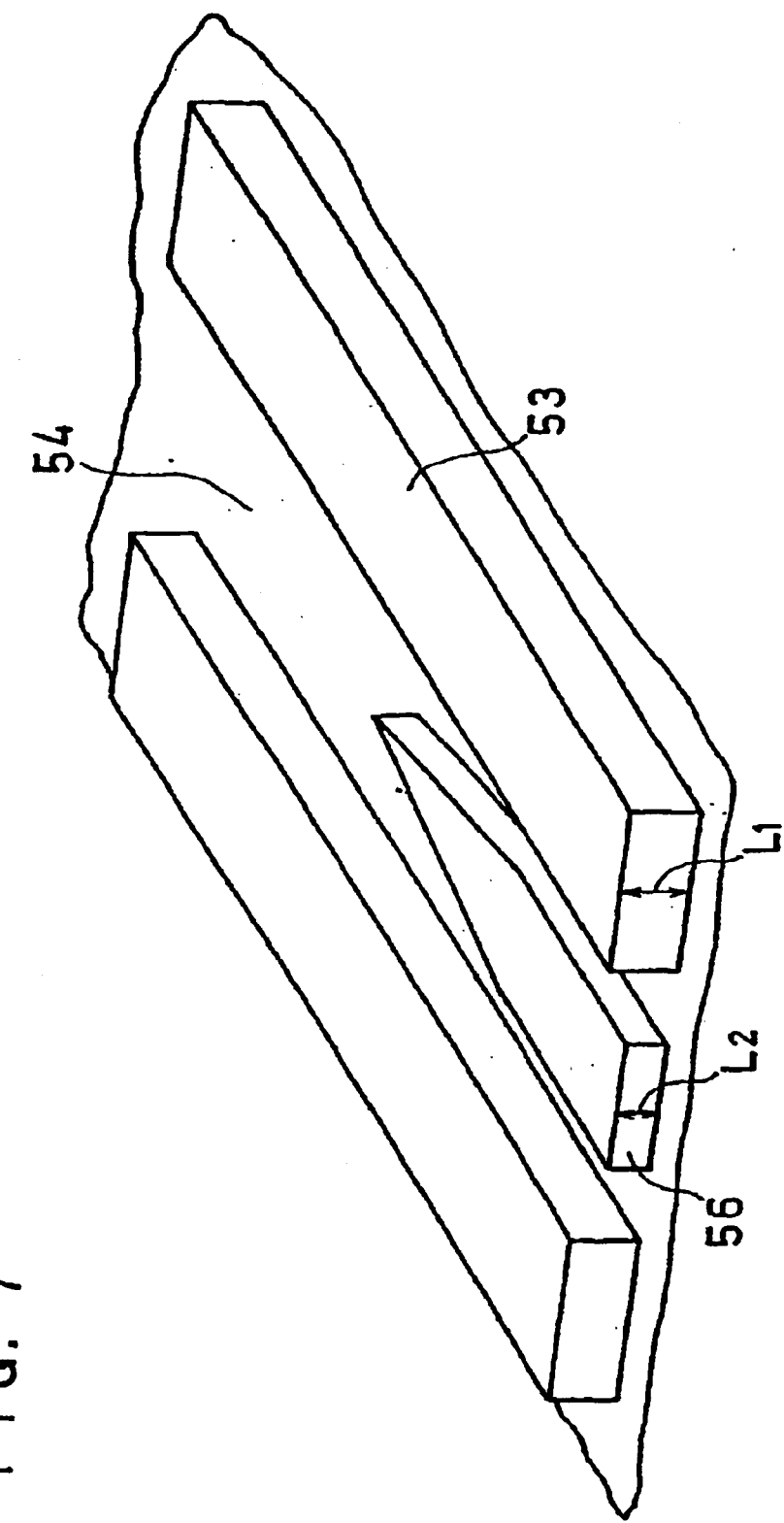
FIG. 7 is an enlarged view of a relevant portion of a separator plate in another example.

In this example, as in Example 6, a mixture of a carbon powder and a phenolic resin was placed in a die firstly and compression molded while being heated, thereby producing a separator plate with the same structure as shown in FIG. 5 except that no protrusion was provided. Subsequently, a protrusion 56 made of a molded mixture of an acrylic resin was integrally formed to the inside of the gas flow channels. As shown in FIG. 6, the protrusion 56 was formed such that the area occupied by the protrusion in the groove forming the gas flow channel increased in the downstream direction. In another example, as shown in FIG. 7, the protrusion was formed such that the height $L_2$ from the bottom of the groove forming the gas flow channel was lower than the height $L_1$ of the rib serving as the current collecting section of the separator plate.

As described above, on the downstream side of the grooves forming the gas flow channels, since the cross-sectional area of the grooves forming the gas flow channels was decreased by the protrusion, the gas flow rate was higher than that on the upstream side. For this reason, water droplets did not accumulate in the grooves forming the gas flow channels, but instead were led to a predetermined flow channel, thus obviating the risk of supply shortage of the reactant gases.

EXAMPLE 8

In this example, a separator plate having a coolant flow channel inside thereof is described with reference to FIG. 8.

A separator plate 60 used herein is formed by bonding separator plates 61a and 61b, corresponding respectively to separator plates 10a and 10b shown in FIG. 1. However, the separator plate 61b has no coolant flow channel. The separator plate 61a has, on one side, a single serpentine gas flow channel for connecting fuel gas manifold apertures 62, and a single serpentine coolant flow channel on the other side. The separator plate 61b also has oxidant gas flow channels on one side, and the other side is flat. The gas and coolant flow channels of the separator plates are formed by grooves each having a depth of 0.5 mm and a width of 5 mm. The two separator plates were bonded with an adhesive such that the gas flow channels thereof face outwardly. The adhesive is applied only to the periphery of the separator plate and the periphery of the respective manifold apertures. Accordingly, the separator plates 61a and 61b are in direct contact with each other at the center, with no adhesive interposed therebetween; consequently, the electrical conduction between the two plates is maintained.

Figure 8:
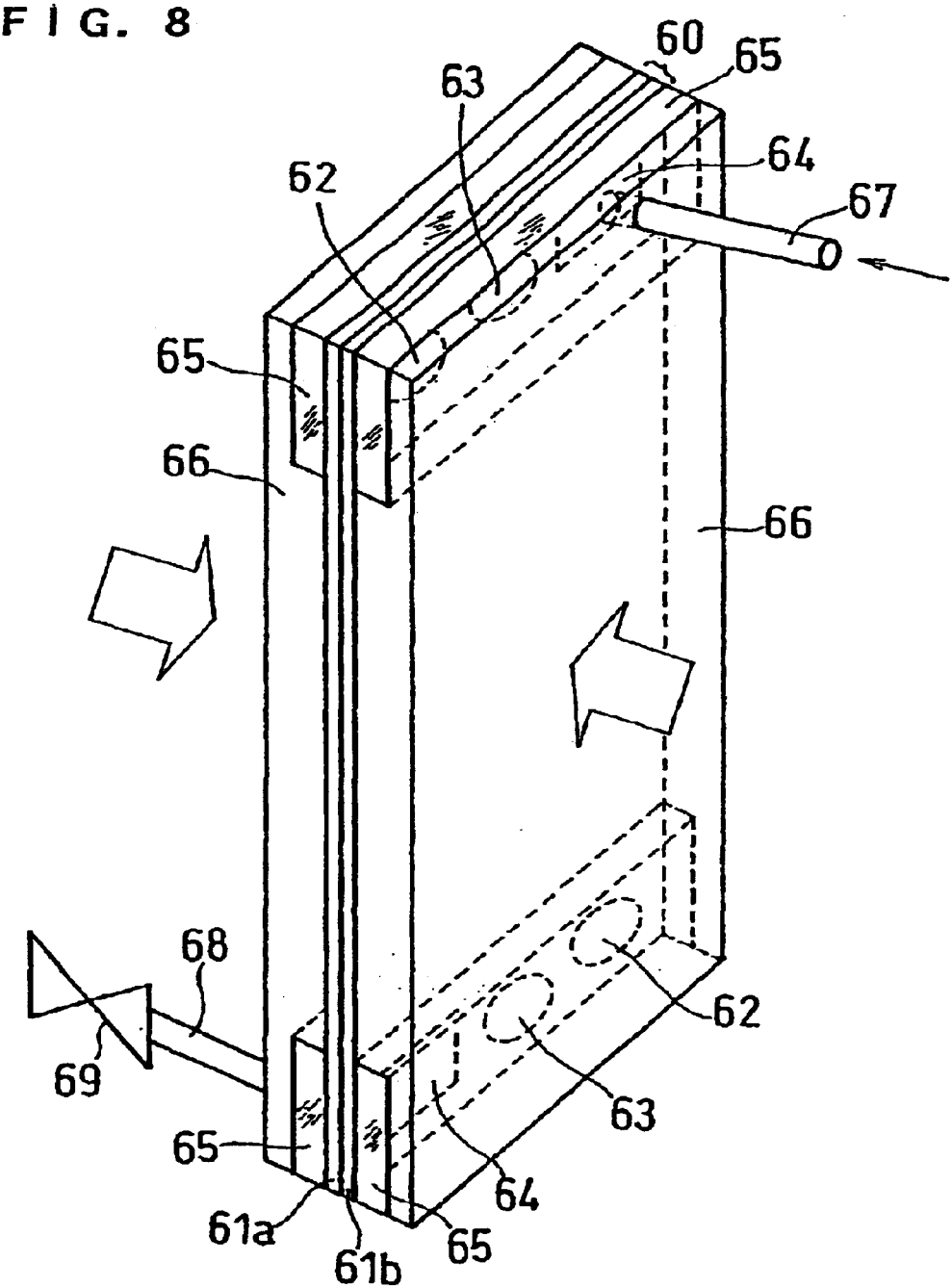
FIG. 8 is a perspective view showing how a coating film is formed on the inner surface of a coolant flow channel of a separator plate having a coolant flow channel.

The separator plate 60 bonded as described above is fixed by a surface pressure applied as shown in FIG. 8, using two sheets of compressing plates 66. The fuel gas and oxidant gas manifold apertures 62 and 63 are sealed with elastic bodies 65 mounted at the inner sides of the compressing plates 66. Of a pair of coolant manifold apertures 64, one on the inlet side is connected to a pipe 67 and one on the outlet side is connected to a pipe 68 having a valve 69.

Firstly, with the valve 69 kept opened, a 15% ethanol solution of poly(vinyl butyral) (degree of polymerization of about 700) prepared as a coating was flowed from the pipe 67 to the inlet-side manifold aperture 64, for several tens of seconds. Thereafter, the valve 69 was closed and the coating was allowed to stand for 30 minutes, while it was being filled up to the inlet located at the upper portion. The reason that the coating was allowed to stand for 30 minutes was to wait until the coating had been sufficiently impregnated into the pores of a molded body of carbon. Then, the valve 69 located at the lower portion was opened to discharge the coating from the coolant flow channel. In this manner, the coating was applied to the inside of the flow channel. Subsequently, air was flowed into the coolant flow channel for six hours at a flow rate of 0.5 L/min in order to facilitate the drying process, and the coating was sufficiently dried. The reason for injecting the coating and performing the drying process while the separator plates were closely attached to each other was to form a film while the two sheets of the molded body were closely attached to each other, thereby minimizing entry of the coating into the contact portion of the two sheets of the molded bodies and the resulting reduction in electrical conduction.

The separator plates each having, on the inner surface of the coolant flow channel, the thus formed dense film through which the coolant was difficult to permeate, were alternately stacked with MEAs to produce a fuel cell stack of 50 cells.

In the case of the fuel cell stack produced in the above-described manner, even when fine gaps or pores were present in the molded body of carbon, which constituted the separator plate provided with the coolant flow channel, the coolant did not leach out to the gas flow channels, so that it was possible to inhibit the undesirable effect on the fuel cell due to the leaching out of the coolant. In addition, even when the coolant was contaminated with metal ions or the like as a result of long time use, the contaminated coolant did not leach out to the gas flow channels because of the dense films formed on the inner surfaces of the coolant flow channels, making it possible to prevent the degradation of the electrolyte membranes constituting the MEAs due to contamination.

EXAMPLE 9

This example employs the same separator plate and MEA as those used in the Example 8.

Figure 9:
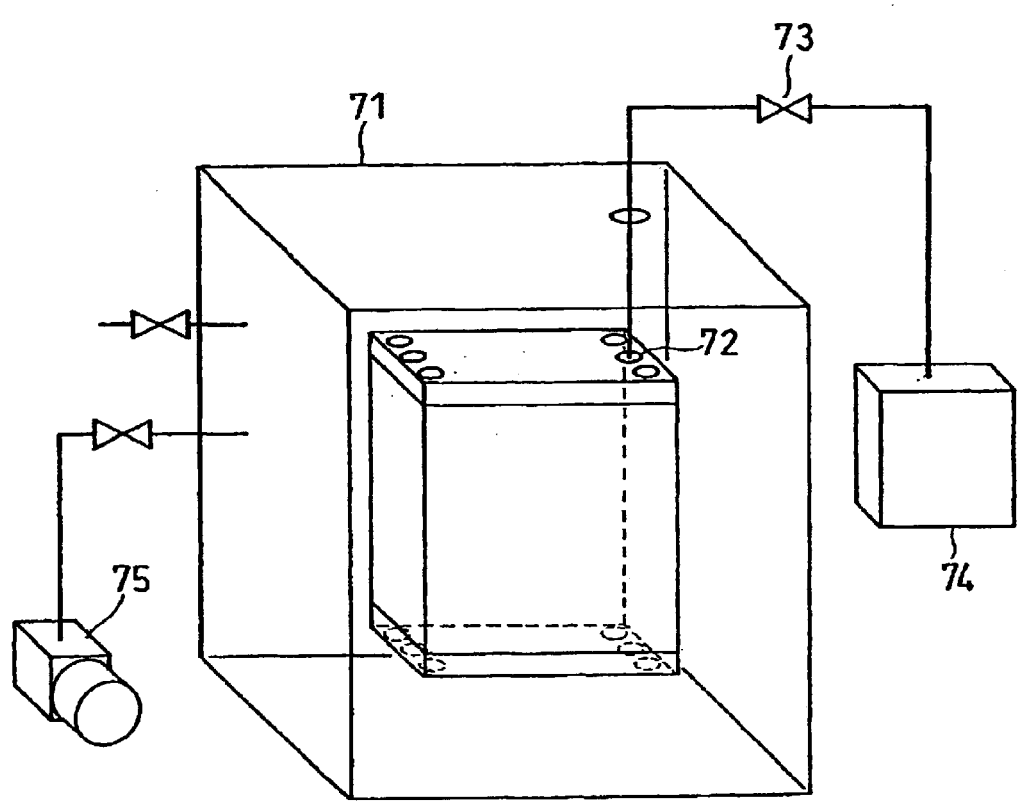
FIG. 9 is a perspective view showing how a coating film is formed on the surface of a coolant flow channel of a separator plate of a cell stack in another example.

In this example, firstly, the MEAs and separator plates were alternately stacked to produce a fuel cell stack of 50 cells with an ordinary stack pressure (about 10 kg/cm$^2$) applied thereto by a compression mechanism disposed at the end portion thereof. The entire fuel cell stack in this state was placed in a vacuum chamber 71, as shown in FIG. 9, and a tube was inserted into a coolant inlet 72 while the remaining coolant inlets and outlets were closed. This tube was extended to the outside of the chamber and connected via a valve 73 to a tank 74 containing a coating. With the valve 73 kept closed, the pressure inside the chamber was reduced to 10$^{-2}$ Torr or lower by means of a rotary vacuum pump 75, and thereafter the valve was opened to supply the coating until the inside of the coolant flow channel was filled with the coating. After closing the valve, the coating was allowed to stand for 5 minutes and the pressure inside the chamber was returned to the atmospheric pressure, and again, the coating was allowed to stand for 5 minutes.

By returning the pressure to the atmospheric pressure after filling the coolant flow channel with the coating under reduced pressure in the above-described manner, the coating was brought into contact with the entire surface in the flow channel, without being interfered by air bubble or the like. Additionally, during the respective five minutes periods of standing still under reduced pressure and under ordinary pressure, the coating was able to be impregnated into the fine gaps present in the carbon separator plate. After the fivemnutes period of standing still under ordinary pressure, the outlet of the coolant was opened to discharge any residual coating inside the flow channel, and compressed air with a gauge pressure of 0.7 kg/cm$^2$ was further supplied from the coolant inlet to forcibly remove the coating accumulated inside. Thereafter, air was supplied at a flow rate per one cell of 0.5 L/min for six hours to completely dry the coating inside.

INDUSTRIAL APPLICABILITY

According to the present invention, a remarkable cost reduction can be achieved by producing a separator plate from a molded body of a mixture comprising an acid resistant binder and carbon, instead of employing a conventional carbon plate produced by cutting. Further, the separator plate in accordance with the present invention has excellent vibration resistance and impact resistance, and is therefore particularly effective for use in the power source for electric vehicles. The polymer electrolyte fuel cell in accordance with the present invention does not induce nonuniform gas distribution among cells due to the accumulation of product water or humidifying water in the gas flow channels of the separator plates and the resulting variations in performance. Moreover, a coolant such as a cooling water not leach out to the gas flow channel side of the separator plate, making it possible to prevent any undesirable effect on the fuel cell due to the leaching out of the coolant.

What is claimed is:

1. A polymer electrolyte fuel cell comprising:
   an electrolyte membrane-electrode assembly including an anode, a cathode and a polymer electrolyte membrane interposed therebetween;
   an anode-side conductive separator plate having a gas flow channel for supplying a fuel gas to said anode;
   a cathode-side conductive separator plate having a gas flow channel for supplying an oxidant gas to said cathode;

a coolant flow channel formed between specific anode-side conductive separator plate and cathode-side conductive separator plate; and means for supplying a fuel gas, an oxidant gas and a coolant to each of said gas flow channels and coolant flow channel, respectively wherein said conductive separator plates comprise a molded body of a mixture comprising a conductive carbon having a hydrophilic functional group at least in a portion of a surface thereof and a binder.

2. The polymer electrolyte fuel cell in accordance with claim 1, wherein surfaces of the gas flow channels of said conductive separator plates are provided with a concave portion and a convex portion to be roughened.

3. The polymer electrolyte fuel cell in accordance with claim 2, wherein said concave portion or convex portion has a cone shape, a pyramid shape, a truncated cone shape or a truncated pyramid shape and a mean diameter or width thereof is 50 $\mu$m to 1 mm.

4. A polymer electrolyte fuel comprising: an electrolyte membrane-electrode assembly including an anode, a cathode and a polymer electrolyte membrane interposed therebetween;

an anode-side conductive separator plate having a gas flow channel for supplying a fuel gas to said anode;

a cathode-side conductive separator plate having a gas flow channel for supplying an oxidant gas to said cathode;

a coolant flow channel formed between specific anode-side conductive separator plate and cathode-side conductive separator plate; and means for supplying a fuel gas, an oxidant gas and a coolant to each of said gas flow channels and coolant flow channel, respectively, wherein said conductive separator plates comprise an insulating plate and a plurality of band-shaped ribs integrally aligned on front and backsides of the insulating plate via a plurality of apertures formed in a recess for forming the gas flow channels of said insulating plate, the gas flow channels being formed between said band-shaped ribs, and said ribs comprising a molded body of a mixture comprising a conductive carbon having a hydrophilic functional group at least in a portion of a surface thereof and a binder.

5. The polymer electrolyte fuel cell in accordance with claim 1, wherein each of the gas flow channels of said conductive separators is constituted by a groove, said groove being branched in a midpoint such that a number of grooves is larger on a downstream side than on an upstream side of a flow of the gas.

6. The polymer electrolyte fuel cell in accordance with claim 5, wherein said groove constituting the gas flow channel has a protrusion on a portion thereof and said protrusion serves to divide said groove constituting the gas flow channel into plural parts on a downstream side.

7. The polymer electrolyte fuel cell in accordance with claim 6, wherein a cross-sectional area, perpendicular to a flow direction of the gas, of said protrusion increases in a downstream direction.

8. The polymer electrolyte fuel cell in accordance with claim 6, wherein said protrusion is electrically conductive.

9. The polymer electrolyte fuel cell in accordance with any of claims 6 to 8, wherein said protrusion is formed to have a height lower than a depth of said groove constituting the gas flow channel so as to allow passage of the gas on an upper surface of said protrusion.

10. The polymer electrolyte fuel cell in accordance with any of claims 6 to 8, wherein said groove constituting the gas flow channel has water repellency at least on a downstream side.

11. The polymer electrolyte fuel cell in accordance with claim 1, wherein the conductive separator plates having said coolant flow channel have a coolant-impermeable film on an inner surface of said coolant flow channel.

12. A method of producing the separator plate for a polymer electrolyte fuel cell in accordance with claim 1, comprising the steps of:

subjecting a conductive carbon to an oxidation treatment to provide said conductive carbon with a hydrophilic functional group on a surface thereof; and mixing a binder with said conductive carbon provided with a hydrophilic functional group, followed by molding a mixture thus obtained to form a conductive separator plate.

13. The method of producing a separator plate for a polymer electrolyte fuel cell in accordance with claim 12, wherein said oxidation treatment is baking in an oxidizing atmosphere or a water vapor atmosphere, irradiation of an active beam or plasma treatment, or an immersion treatment in an acidic solution.

14. A method of producing the polymer electrolyte fuel cell in accordance with claim 11, comprising the steps of:

assembling a stack of polymer electrolyte fuel cells each comprising: an electrolyte membrane-electrode assembly including an anode, a cathode and a polymer electrolyte membrane interposed therebetween; an anode-side conductive separator plate having a gas flow channel for supplying a fuel gas to said anode; a cathode-side conductive separator plate having a gas flow channel for supplying an oxidant gas to said cathode; a coolant flow channel formed between specific anode-side conductive separator plate and cathode-side conductive separator plate; and means for supplying a fuel gas, an oxidant gas and a coolant to each of said gas flow channels and coolant flow channel, respectively; and injecting a pre-polymer of a non-conductive polymer into said coolant flow channel to apply the pre-polymer on an inner surface of the flow channel, while applying a clamping pressure to said stack.

15. The polymer electrolyte fuel cell in accordance with claim 7, wherein said protrusion is electrically conductive.

16. The polymer electrolyte fuel cell in accordance with claim 9, wherein said groove constituting the gas flow channel has water repellency at least on a downstream side.

* * * * *